Oct. 6, 1936.  F. G. RICHARDSON  2,056,691

FASTENER FOR TRIM PANELS AND THE LIKE

Filed July 16, 1934

INVENTOR
Frederick G. Richardson

BY
Whittemore Hulbert Whittemore & Belknap
ATTORNEYS

Patented Oct. 6, 1936

2,056,691

UNITED STATES PATENT OFFICE 2,056,691

FASTENER FOR TRIM PANELS AND THE LIKE

Frederick G. Richardson, Detroit, Mich., assignor to Briggs Manufacturing Company, Detroit, Mich., a corporation of Michigan Application July 16, 1934, Serial No. 735,527

9 Claims. (Cl. 24—215)

This invention relates to fastener elements and more particularly to snap fastener devices designed for detachably securing trim panels and the like to supports such, for instance, as the framework of motor vehicle bodies.

One of the important objects of this invention is to provide a fastener assembly of this type having means for anchoring the same to the trim panel whereby the fastener elements may be moved to inoperative position substantially parallel with the trim panel to permit stacking of the panels, or may be moved to an operative position perpendicular to the panel and held in this position to facilitate the engagement of the fastener elements with the supporting structure during the attachment of the trim panels thereto.

Other objects of the invention are obtained by reason of the novel combination, construction and arrangement of the parts, all of which will be made more apparent as this description proceeds, especially when considered in connection with the accompanying drawing, wherein Figure 1 is a fragmentary perspective view of a trim panel having one of my improved fastener assemblies attached thereto;

Figure 1:
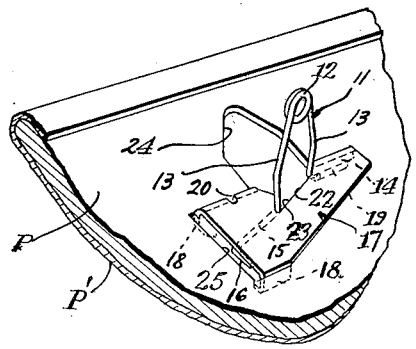

While the fastener element assembly herein illustrated is capable of many uses, it finds particular utility when used in fastening upholstery or trim panels to the framework of a motor vehicle or the like.

In the drawing, the reference character S indicates the support to which the upholstery or trim panel P is adapted to be attached. The support S may, for instance, be the framework of a motor vehicle provided with apertures 10 through which the fastener elements 11 project, each fastener element resiliently engaging the edge of the aperture.

Each fastener element is preferably formed of a single strip of resilient sheet metal, wire or the like, the fastener element herein illustrated being formed of resilient wire. The strip of resilient material is bent intermediate its ends to form a loop 12 constituting a nose which facilitates the insertion of the fastener into the apertures 10 of the supporting structure. Extending from the loop 12 are a pair of resilient legs 13 which are bowed intermediate their length to form diverging and converging portions. Upon insertion of the fastener into a supporting aperture 10, the shank portion of the fastener which is composed of legs 13 spring toward one another sufficiently to permit the outwardly bowed portions to pass the aperture whereupon the legs spring apart to resiliently engage the edge of the aperture, as is well-known in this art.

The legs 13 of the fastener element terminate in oppositely extending extensions 14 and 15 forming attaching portions. The extremity of the attaching portion 15 is angularly bent with respect thereto to form an angular projection 16 for a purpose to be more fully hereinafter referred to.

The reference character 17 indicates a retainer or anchorage plate preferably formed of sheet metal and adapted to be rigidly secured to the underside of the trim panel P by means of prongs 18 forced into or through the panel and secured by being bent over or clinched thereagainst. In practice, each trim panel consists of a body or backing formed of cardboard, fibrous material, composition material, or the like, having a finish or decorative cover P' secured to the front face thereof. If the prongs 18 extend through the backing of the trim panel, they will be concealed from view by the covering P'.

Figure 2:
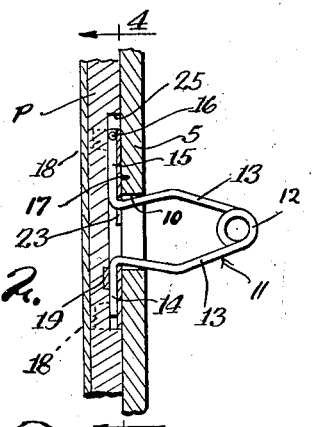
Figure 2 is a sectional elevational view showing the trim panel in assembled relation with a support.
Figure 3:
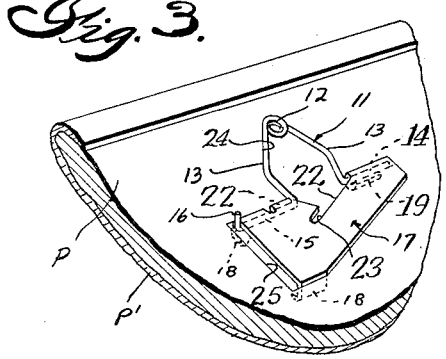
Figure 3 is a view similar to Figure 1 showing the fastener element moved to inoperative position.
Figure 5:
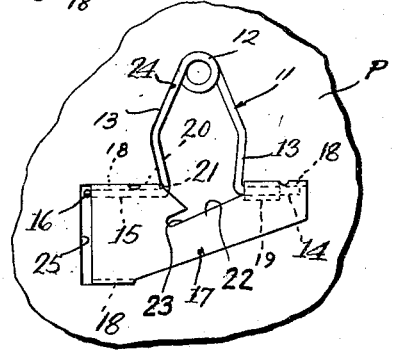
Figure 5 is a plan view showing the fastener element in inoperative position.
Figure 7:
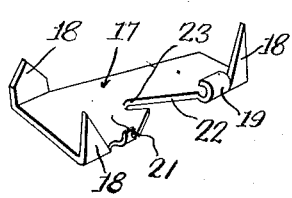
Figure 7 is a perspective view of the anchorage or retainer plate as seen from the bottom side thereof.

The retainer plate 17 has a journal bearing 19 formed preferably on one edge thereof, this journal bearing being formed by cutting and curling a lip at the edge of the retainer plate. This journal bearing is adapted to receive the attaching portion 14 of the fastener element and to thus secure the fastener element to the retainer plate for swinging movement from a position substantially parallel or flush with the trim panel, such as shown in Figures 3 and 5, to a position substantially perpendicular thereto, such as shown in Figures 1 and 2.

Projecting at a substantially right angle from the same edge of the retainer edge 17 is a lug 20 which forms a stop to limit movement of the other extension 15 of the fastener element in one direction. This lug is also provided with a recess 21 which is engaged by the adjacent leg 13 of the fastener element when the latter is in inoperative position for holding the fastener element in this inoperative position.

Arranged between the bearing portion 19 and lug 20 at the same edge of the retainer plate 17 is a re-entrant recess 22 provided at the portion thereof adjacent the attaching portion 15 with an open-ended slot 23, the latter being directed inwardly toward the center of the retainer plate and at an angle with respect to the axis of rotation of the attaching portion 14.

The attaching portion 15 of the fastener element is capable of sliding movement between the lug 20 and the edge of the re-entrant recess 22, and is adapted when thus angularly displaced to have one leg thereof engage in the slot 23. It will be understood that the attaching portion 15 of the fastener element slides in the space between the adjacent face of the panel P and the underside of the retainer plate 17, and as heretofore mentioned, this movement is limited in one direction by the lug 20, and in the opposite direction by the edge of the re-entrant recess 22.

In order that the retainer plate 17 and the fastener element 11 may, in the inoperative position of the latter, lay substantially flush with the major surface of the underside of the panel P, the panel may be recessed as at 24 and 25, although obviously such recessing is not necessary if it is deemed unnecessary to arrange the fastener and retainer plate flush with the panel surface.

In describing the operation of my improved fastener assembly, it will of course be understood by those skilled in this art that the fastener is formed of resilient material, and that therefore the legs 13 thereof normally tend to spring apart. Thus when the fastener element is in inoperative position, such as illustrated in Figures 3 and 5, one of the legs 13 thereof is resiliently held in engagement with the recess 21 of the lug 20 to thus hold the fastener element in its inoperative position substantially parallel with the undersurface of the trim panel. When it is desired to assemble the panel with a supporting structure, each of the fastener elements is first swung from its inoperative position to a position substantially perpendicular to the panel surface about the axis of the attaching portions 14 and 15. During this movement, the angular projection or extension 16 of the attaching portion 15 is swung from a position perpendicularly to the panel surface to a position substantially parallel therewith and also parallel with the retainer plate 17. Thereafter, the leg portions 13 of the fastener element are squeezed or sprung toward one another and the fastener element is then bodily shifted in an arc about the axis of the leg 13 which terminates in the attaching portion 14 to bring the opposite leg 13 opposite the slot 23 whereupon when the fastener element is released this leg 13 resiliently engages in the slot 23. During this movement, a slight torque is obviously placed upon the leg 13 which terminates in the attaching portion 14 because angular movement of this attaching portion 14 is prevented by reason of its engagement in the journal bearing portion 19. The engagement of the opposite leg portion 13 in the slot 23 acts to hold the fastener element in a position perpendicular to the trim panel. During this bodily shifting of the fastener element, the projection 16 is moved to a position under the retainer plate and between this plate and the adjacent surface of the panel so that any swinging movement of the fastener is obviously further resisted.

Figure 4:
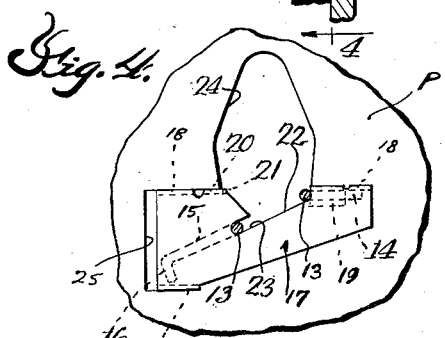
Figure 4 is a sectional elevational view taken substantially on the plane indicated by line 4—4 in Figure 2.
Figure 6:
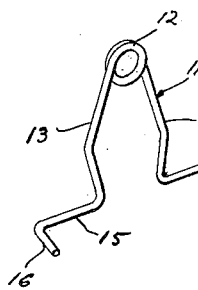
Figure 6 is a separated perspective view of the fastener element.

Thus the fastener element is held in the operative position shown in Figures 1, 2 and 4 whereupon the trim panel may be secured to its support by engaging the fastener elements with the apertures 10 formed in the supporting structure. During engagement of the fastener elements with the apertures the leg portions move toward one another, as previously explained, but swinging movement of the fastener out of its perpendicular plane is prevented first because the length of the slot 23 is preferably longer than the relative movement of the legs, and secondly because the angular projection 16 is engaged between the underside of the retainer plate and the adjacent face of the panel and also resists any swinging movement of the fastener element.

From the foregoing, it will be obvious that I have provided a fastener element assembly in which the fastener element may be held in inoperative position substantially flush with the rear face of the trim panel, or in an operative position perpendicular thereto. The retainer or anchorage plate provides means for mounting the fastener element for swinging movement and for bodily shifting movement in a plane transverse to the plane of the swinging movement of the fastener element. The retainer plate is so constructed that it cooperates with the resilient leg portions of the fastener element to securely hold the fastener element in either its inoperative or operative position and thus produces a commercially practical structure which, with the fastener elements permanently attached, may be readily stacked with the elements in inoperative position, or easily attached to a supporting structure when the elements are in operative position.

While an embodiment of this invention has been described and illustrated herein somewhat in detail, it will be readily apparent to those skilled in this art that various changes in many of the details of construction may be resorted to without departing from the spirit and scope of this invention, and to this end reservation is made to make such changes as may come within the purview of the accompanying claims.

What I claim as my invention is:

1. A separable snap fastener for detachably securing a trim panel to a support comprising a fastener element having outwardly bowed leg portions insertable within an opening formed in said support and engageable with the side walls of the opening to maintain the element in assembled relation with the said support, said leg portions terminating in opposed extensions, a retainer plate secured to said trim panel having means for rotatably journaling said extensions for movement of said fastener element in a plane perpendicular to said trim panel, and means on said retainer plate for slidably securing one of the extensions of said fastener element for bodily angular movement of the fastener element in a plane transverse to said aforementioned movement.

2. A separable snap fastener for detachably securing a trim panel to a support comprising a fastener element having outwardly bowed leg portions insertable within an opening formed in said support and engageable with the side walls of the opening to maintain the element in assembled relation with the said support, said leg portions terminating in opposed extensions, a retainer plate secured to said trim panel having means for rotatably journaling said extensions for movement of said fastener element in a plane perpendicular to said trim panel, means on said retainer plate for slidably securing one of the extensions of said fastener element for bodily angular movement of the fastener element in a plane transverse to said aforementioned movement, and means on said retainer plate engageable with said fastener element upon said angular movement for holding said fastener element in operative position.

3. A separable snap fastener for detachably securing a trim panel to a support comprising a fastener element having outwardly bowed leg portions insertable within an opening formed in said support and engageable with the side walls of the opening to maintain the element in assembled relation with the said support, said leg portions terminating in opposed extensions, mounting means on the trim panel engageable with the extensions to support said fastener element on said trim panel for movement in a plane perpendicular to said trim panel and for bodily angular movement in the plane of said trim panel.

4. A separable snap fastener for detachably securing a trim panel to a support comprising a fastener element having outwardly bowed leg portions insertable within an opening formed in said support and engageable with the side walls of the opening to maintain the element in assembled relation with said support, said leg portions terminating in opposed extensions, a retainer plate secured to said trim panel, means on said retainer plate for rotatably journaling said extensions whereby said fastener element may be moved from an inoperative position substantially parallel with said trim panel to an operative position perpendicular thereto, and means on said retainer plate engaging one of the extensions, to permit bodily angular movement of said fastener element in a plane transverse to the plane of the aforementioned movement for securing said fastener element in operative position.

5. A separable snap fastener for detachably securing a trim panel to a support comprising a fastener element having outwardly bowed leg portions insertable within an opening formed in said support and engageable with the side walls of the opening to maintain the element in assembled relation with said support, said leg portions terminating in opposed extensions, a retainer plate secured to said trim panel, means on said retainer plate for rotatably journaling said extensions whereby said fastener element may be moved from an inoperative position substantially parallel with said trim panel to an operative position perpendicular thereto, means on said retainer plate engageable with one of the extensions of said fastener element permitting bodily angular movement of said fastener element, and a recess in said retainer plate engageable with a leg of said fastener element after said angular movement for holding said fastener element in operative position.

6. A separable snap fastener for detachably securing a trim panel to a support comprising a fastener element having outwardly bowed leg portions insertable within an opening formed in said support and engageable with the side walls of the opening to maintain the element in assembled relation with said support, said leg portions terminating in opposed extensions, a retainer plate secured to said trim panel, means on said retainer plate for rotatably journaling said extensions whereby said fastener element may be moved from an inoperative position substantially parallel with said trim panel to an operative position perpendicular thereto, means on said retainer plate including a re-entrant recess having a slot communicating therewith permitting bodily angular movement of said fastener element when the same is in its perpendicular position to engage one of the legs of said fastener element in said slot to hold said fastener element in operative position.

7. A separable snap fastener for detachably securing a trim panel to a support comprising a fastener element having outwardly bowed leg portions insertable within an opening formed in said support and engageable with the side walls of the opening to maintain the element in assembled relation with said support, said leg portions terminating in opposed extensions, a retainer plate secured to said trim panel, means on said retainer plate for rotatably journaling said extensions whereby said fastener element may be moved from an inoperative position substantially parallel with said trim panel to an operative position perpendicular thereto, means on said retainer plate engaging the other extension of said fastener element permitting bodily movement of said fastener element when in perpendicular position, and an angular projection on one of said extensions engageable between the retainer plate and the adjacent face of the panel for holding said fastener element in operative position.

8. A separable snap fastener for detachably securing a trim panel to a support comprising a fastener element mounted on the trim panel for bodily angular movement in the plane of said panel and also for movement in a plane perpendicular to the panel, said fastener element having outwardly bowed leg portions insertable within the opening formed in said support and engageable with the side walls of the opening to maintain the element in assembled relation with said support.

9. A separable snap fastener for detachably securing a trim panel to a support, comprising a fastener element having outwardly bowed leg portions insertable within an opening formed in said support and engageable with the side walls of the opening to maintain the element in assembled relation with the support, attaching portions carried by the leg portions aforesaid, mounting means engageable with the attaching portions and supporting the fastener element on the trim panel for movement in a plane perpendicular to the panel and also for bodily angular movement in the plane of the trim panel, and means engageable with the fastener element upon said angular movement for holding the element in a predetermined position with respect to the trim panel.

FREDERICK G. RICHARDSON.